(12) United States Patent
Huang et al.

(10) Patent No.: US 10,523,079 B2
(45) Date of Patent: Dec. 31, 2019

(54) ROTOR ASSEMBLY FOR AN ELECTRIC MACHINE WITH THERMAL MANAGEMENT FEATURES

(71) Applicant: GE AVIATION SYSTEMS LLC, Grand Rapids, MI (US)

(72) Inventors: Hao Huang, Vandalia, OH (US); Xiaochuan Jia, Vandalia, OH (US); Paul James Wirsch, Jr., Vandalia, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 171 days.

(21) Appl. No.: 14/916,700

(22) PCT Filed: Sep. 6, 2013

(86) PCT No.: PCT/US2013/058424
§ 371 (c)(1),
(2) Date: Mar. 4, 2016

(87) PCT Pub. No.: WO2015/034514
PCT Pub. Date: Mar. 12, 2015

(65) Prior Publication Data
US 2016/0204663 A1    Jul. 14, 2016

(51) Int. Cl.
*H02K 3/52* (2006.01)
*H02K 1/28* (2006.01)
(Continued)

(52) U.S. Cl.
CPC .............. *H02K 3/52* (2013.01); *H02K 1/02* (2013.01); *H02K 1/24* (2013.01); *H02K 1/26* (2013.01);
(Continued)

(58) Field of Classification Search
CPC .......... H02K 1/24; H02K 3/527; H02K 3/52; H02K 1/26; H02K 1/32; H02K 1/265;
(Continued)

(56) References Cited

U.S. PATENT DOCUMENTS 2,386,673 A * 10/1945 Fisher .................... H02K 3/493
                                                310/214
2,736,829 A *  2/1956 Sills ........................ H02K 1/08
                                                310/216.048
(Continued)

FOREIGN PATENT DOCUMENTS

CN      201781344 U    3/2011
CN      102347652 A    2/2012
(Continued)

OTHER PUBLICATIONS

Thermal Conductivity of Metals from Engineering Tool Box.*
(Continued)

*Primary Examiner* — Mang Tin Bik Lian
*Assistant Examiner* — Maged M Almawri
(74) *Attorney, Agent, or Firm* — McGarry Bair PC (57) ABSTRACT

A rotor assembly (40) for an electric machine including a core (42) having at least one post (44) about which a winding may be wound, and a cap (52) coupled to the post (44) and having a portion overlying a winding (46), wherein the cap (52) comprises a plurality of laminations and the core (42) does not comprise a plurality of laminations.

20 Claims, 7 Drawing Sheets

(51) Int. Cl.
*H02K 9/22* (2006.01)
*H02K 19/38* (2006.01)
*H02K 1/02* (2006.01)
*H02K 1/24* (2006.01)
*H02K 1/32* (2006.01)
*H02K 1/26* (2006.01)
*H02K 19/02* (2006.01)
*H02K 19/16* (2006.01)
*H02K 3/18* (2006.01)
*H02K 9/02* (2006.01)
*H02K 9/19* (2006.01)

(52) U.S. Cl.
CPC .............. *H02K 1/265* (2013.01); *H02K 1/28* (2013.01); *H02K 1/32* (2013.01); *H02K 1/325* (2013.01); *H02K 3/18* (2013.01); *H02K 3/527* (2013.01); *H02K 9/22* (2013.01); *H02K 19/02* (2013.01); *H02K 19/16* (2013.01); *H02K 19/38* (2013.01); *H02K 9/02* (2013.01); *H02K 9/19* (2013.01)

(58) Field of Classification Search
CPC .. H02K 1/02; H02K 1/00; H02K 1/28; H02K 1/325; H02K 3/18; H02K 19/02; H02K 19/16; H02K 19/38; H02K 9/22; H02K 9/02; H02K 9/19; H02K 3/34; H02K 3/345
USPC .................. 310/262, 216.051, 261.086, 269, 310/261.1–266, 216.001–216.091, 52–64
See application file for complete search history.

(56) References Cited

U.S. PATENT DOCUMENTS

| | | | | |
|---|---|---|---|---|
| 3,235,758 A * | 2/1966 | Dinsmore | .............. | H02K 7/106 310/93 |
| 4,862,024 A * | 8/1989 | Stingle | .............. | H02K 9/19 165/47 |
| 5,189,325 A * | 2/1993 | Jarczynski | .............. | H02K 9/19 310/54 |
| 5,932,948 A * | 8/1999 | Morrison | .............. | H02K 3/527 310/214 |
| 6,794,792 B2 * | 9/2004 | Wang | .............. | H02K 55/04 310/179 |
| 6,849,987 B2 * | 2/2005 | Tornquist | .............. | H02K 3/527 310/260 |
| 7,492,073 B2 * | 2/2009 | Qu | .............. | H02K 19/103 310/178 |
| 7,687,928 B2 * | 3/2010 | Taneja | .............. | F01D 15/10 290/31 |
| 8,018,114 B2 | 9/2011 | Rasumussen et al. | | |
| 8,148,834 B2 * | 4/2012 | Huang | .............. | F02N 11/04 290/31 |
| 8,232,702 B2 * | 7/2012 | Zywot | .............. | H02K 3/527 310/214 |
| 9,041,232 B2 * | 5/2015 | Shah | .............. | H02K 19/24 290/1 A |
| 9,203,284 B2 * | 12/2015 | Kaiser | .............. | H02K 3/527 |
| 2003/0030333 A1 | 2/2003 | Johnsen | | |
| 2004/0263019 A1 | 12/2004 | Buchan et al. | | |
| 2005/0253476 A1 | 11/2005 | Zhong | | |
| 2007/0063612 A1 * | 3/2007 | Oh | .............. | H02K 3/345 310/261.1 |
| 2008/0001495 A1 * | 1/2008 | Qu | .............. | H02K 19/103 310/268 |
| 2010/0133946 A1 | 6/2010 | Lemmers, Jr. et al. | | |
| 2010/0295301 A1 * | 11/2010 | Huang | .............. | F02N 11/04 290/31 |
| 2010/0295411 A1 * | 11/2010 | Hatch | .............. | H02K 1/24 310/261.1 |
| 2011/0025160 A1 | 2/2011 | Stancu et al. | | |
| 2012/0025639 A1 * | 2/2012 | Zywot | .............. | H02K 3/527 310/54 |
| 2012/0126643 A1 * | 5/2012 | Zhong | .............. | H02K 1/32 310/59 |
| 2013/0207395 A1 | 8/2013 | Huang et al. | | |
| 2014/0265660 A1 * | 9/2014 | Kulkarni | .............. | H02K 9/19 310/54 |
| 2014/0265668 A1 | 9/2014 | Dutau | | |
| 2015/0022035 A1 | 1/2015 | Yamada et al. | | |

FOREIGN PATENT DOCUMENTS

| | | |
|---|---|---|
| CN | 103036331 A | 4/2013 |
| DE | 9003390 U1 | 6/1990 |
| DE | 102011121793 A1 | 6/2013 |
| EP | 0415057 A1 | 3/1991 |
| EP | 0461905 A2 | 12/1991 |
| EP | 2413480 A2 | 2/2012 |
| EP | 3 046 230 A1 | 7/2016 |
| JP | 5594549 A | 7/1980 |
| JP | 55173255 U | 12/1980 |
| JP | S56-66146 A | 6/1981 |
| JP | S57-21240 U | 2/1982 |
| JP | 5877009 U | 5/1983 |
| JP | 5913544 U | 7/1984 |
| JP | 06351203 A | 12/1994 |
| JP | 09247879 A | 9/1997 |
| JP | 2000166139 A | 6/2000 |
| JP | 2004-088876 A | 3/2004 |
| JP | 2007-189849 A | 7/2007 |
| JP | 2009-017776 A | 1/2009 |
| JP | 2009136063 A | 6/2009 |
| WO | 2005114812 A1 | 12/2005 |
| WO | 2007146246 A2 | 12/2007 |
| WO | 2013076791 A1 | 5/2013 |

OTHER PUBLICATIONS

Electrical resistivity and conductivity—Wikipedia.*
International Search Report and Written Opinion dated Sep. 12, 2014 which was issued in connection with PCT Patent Application No. PCT/US2013/058424 which was filed on Sep. 6, 2013.
PCT Search Report and Written Opinion issued in connection with Related Application No. PCT/US2013/068299 dated Aug. 12, 2015.
PCT Search Report and Written Opinion issued in connection with Related Application No. PCT/US2013/068307 dated Aug. 12, 2015.
Unofficial English Translation of Japanese Office Action issued in connection with corresponding JP Application No. 2016540859 dated Feb. 28, 2017.
Canadian Office Action issued in connection with corresponding CA Application No. 2922464 dated Mar. 1, 2017.
Unofficial English Translation of Chinese Office Action issued in connection with corresponding CN Application No. 201380079387.8 dated Aug. 3, 2017.
U.S. Appl. No. 15/027,464, filed Apr. 6, 2016, Huang Hao et al.
Machine Translation and Notification of Reasons for Refusal issued in connection with corresponding JP Application No. 2016-540859 dated Oct. 31, 2017.
Office Action issued in connection with corresponding CA Application No. 2922464 dated Dec. 4, 2018.
Machine Translation and Third office action and search issued in connection with corresponding CN Application No. 201380079387.8 dated Jan. 3, 2019.

* cited by examiner

ROTOR ASSEMBLY FOR AN ELECTRIC MACHINE WITH THERMAL MANAGEMENT FEATURES

BACKGROUND

Electric machines, such as electric motors and/or electric generators, are used in in energy conversion. In the aircraft industry, it is common to find combination of motor and generator mode, where the electric machine in motor mode is used to start the engine, and, depending on the mode, functions as a generator, too. Regardless of the mode, the machines typically include a rotor having main windings that are driven to rotate by a source of rotation, such as a mechanical or electrical machine, which for some aircraft may be a gas turbine engine.

BRIEF DESCRIPTION

A rotor assembly for an electric machine including a core having at least one post about which a winding may be wound to define a pole for the electric machine, with the at least one post at least partially defining a winding seat, and a cap coupled to the post and having a portion overlying a winding to collectively define an axial extending winding slot with the core, wherein the cap comprises a plurality of laminations and the core does not comprise a plurality of laminations.

DETAILED DESCRIPTION

While embodiments of the innovation may be implemented in any environment using synchronous electric machine or main machine, a specific example of which is a generator. The generator is currently contemplated to be implemented in a jet engine environment. Embodiments of the innovation may alternatively include a starter/generator and may provide turbine engine starting capabilities, wherein the starter/generator provides the mechanical power to drive the turbine engine through a starting method. A brief summary of the contemplated generator environment should aid in a more complete understanding.

Figure 1:
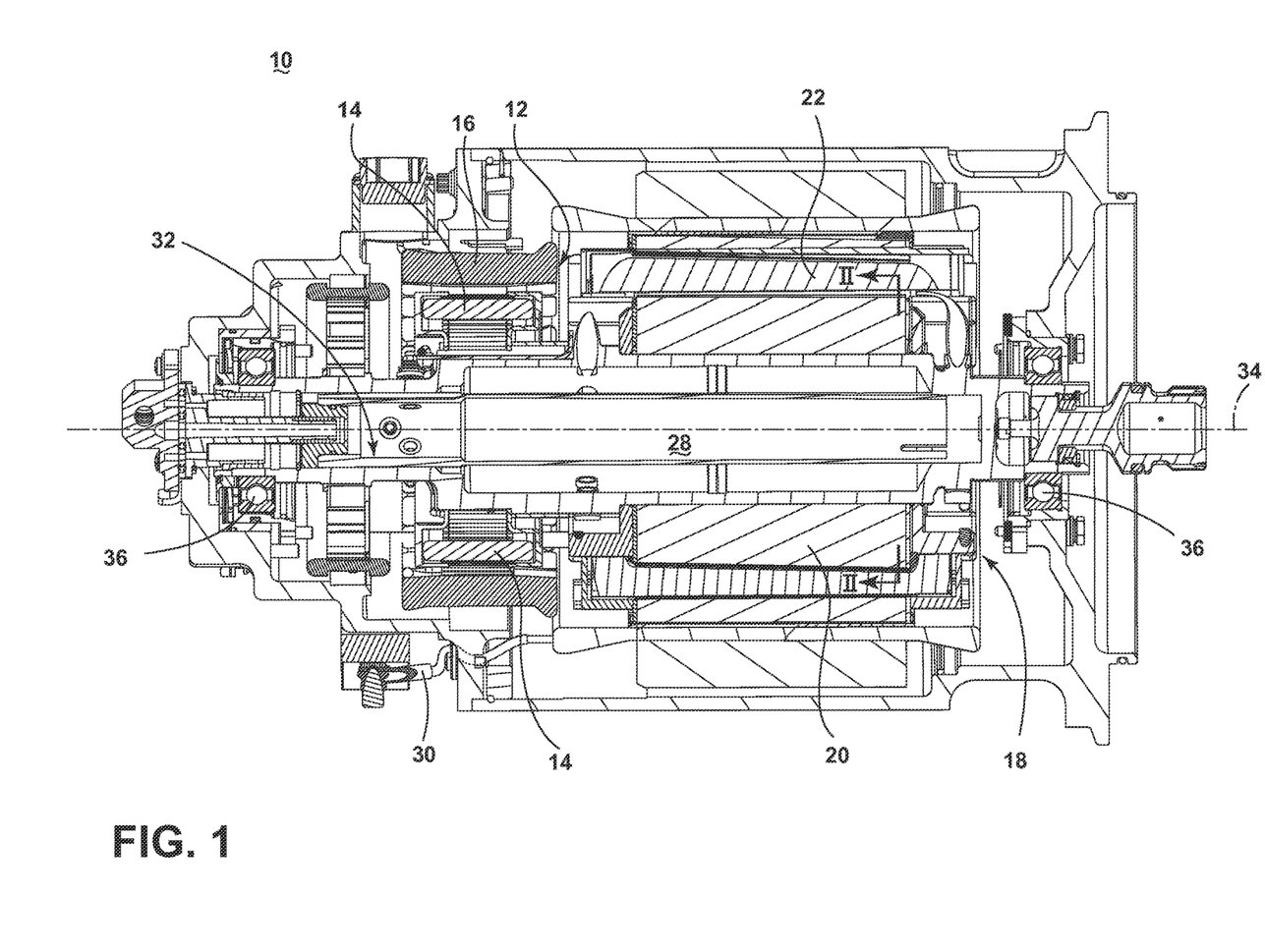
FIG. 1 is a sectional view of a generator assembly.

FIG. 1 illustrates an electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and may provide for a three phase with a ground reference output from the electrical machine assembly 10.

The electrical machine assembly 10 further comprises a rotatable shaft 32 mechanically coupled to a source of axial rotation, which may be a gas turbine engine, about an axis of rotation 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 may be mounted to any suitable part of a housing portion of the electrical machine assembly 10. The rotatable shaft 32 is configured such that mechanical force from a running turbine engine provides rotation to the shaft 32. Alternatively, in the example of a starter/generator, rotation of the rotatable shaft 32 of the electrical machine assembly 10 during a starting mode produces a mechanical force that is transferred through the shaft 32 to provide rotation to the turbine engine.

The rotatable shaft 32 may further include a central coolant passage 28 extending axially along the interior of the shaft 32. The central coolant passage 28 allows coolant, for example, oil or air, to flow through the interior of the rotatable shaft 32. In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
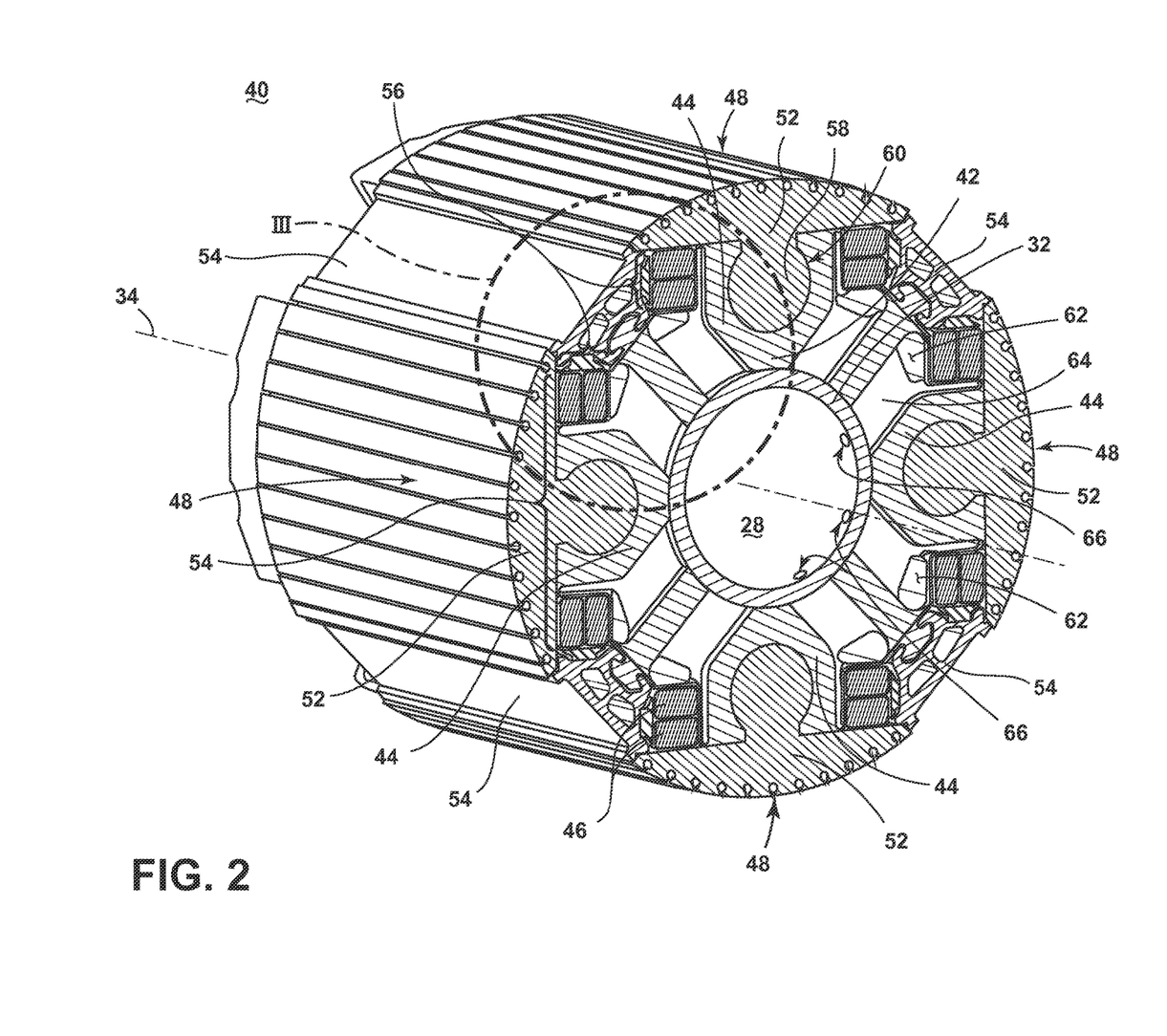
FIG. 2 is a partial perspective sectional view taken along line 2-2 of FIG. 1 showing the rotor assembly.

FIG. 2 illustrates a perspective view of the main machine rotor assembly 40 with at least a portion of the axial front end of the assembly 40 cut away. The rotor assembly 40 is shown comprising a core 42 having at least one post 44 extending radially from the core 42, about which a rotor winding 46, which may be electrically isolated from each other, may be wound to define a pole 48 for the assembly 40. As shown, each of four poles 48 of the rotor assembly 40 includes one rotor winding 46, wound axially about a post 44 to define a rotor winding set 50. The core 42 may be, for instance, molded, formed, or bored from a non-laminated or non-lamination, solid or unitary body material. One such example of a core body material may be steel. Alternate body materials and formations of the core 42 are envisioned, for instance, using additive manufacturing.

Each pole 48 of the rotor assembly 40 further comprises a cap 52. The rotor assembly 40 further comprises additional radial elements 54 spaced radially about the assembly 40, adjacent to, and in an alternating arrangement with, the multitude of caps 52. Each cap 52 at least partially overlies each post 44, pole 48, and rotor winding set 50, and is spaced from each adjacent cap 52 by the radial element 54, such that the collective cap 52, radial element 54, and posts 44 of the core 42 at least partially define an axially extending winding slot 56 for receiving the rotor windings 46.

Each cap 52 may be formed or comprised by a plurality of laminations, for instance, cobalt laminations. In this instance, cobalt laminations may comprise the cap 52 due to its high magnetic and electrical resistance properties, and thus, its ability to minimize eddy currents at the surface of each pole 48. Cobalt laminations are merely one example of a material used to construct the cap 52, and alternate material composition or compositions are envisioned. Comparing the cap 52 to the core 46, the cap 52 may be less electrically conductive and less thermally conductive than the core 42.

Each cap 52 is removably coupled with the posts 44 of the core 42 via an interlocking of the cap 52 with the posts 44. As shown, the interlock comprises a projection 58 on the cap 52 and a recess 60 on the post 44, wherein both the cap projection 58 and post recess 60 have partially circular, complementary cross sections, such that the projection 58 is received within the post recess 60 to removably couple the cap 52 to the post 44. Alternatively, embodiments are envisioned wherein the interlocking elements are reversed, for example, a projection 58 on the post 44, and a recess 60 on the cap 52.

The core 42 further at least partially defines internal coolant passages 62 on the posts 44, located adjacent to, and extending axially in parallel with, the winding slots 56, and radial coolant passages 64 extending radially from the center of the core 42 to each internal coolant passage 62. The internal coolant passages 62 may be, for example, molded, formed, or bored into the core 42, and are at least partially separated from the rotor windings 46 by, for instance, a thin portion of the post 44, allowing for thermal transfer between the windings 46 and the coolant. The rotatable shaft 32 may additionally include a plurality of coolant passage holes 66 that are radially spaced about the shaft 32 such that they align with radial coolant passages 64, and allows for coolant to flow from the central coolant passage 28 to and from the radial coolant passages 64.

The assembled rotatable shaft 32 with coolant passage holes 66 and central coolant passage 28, and core 42 with internal coolant passages 62 and radial coolant passages 64 defines a coolant path wherein coolant may fluidly traverse, flow, or be forcibly pumped from the coolant passage holes 66, through the radial coolant passage 64, to the internal coolant passage 62, and returned to the central coolant passage 28. The rear axial end of the rotor assembly 40 may comprise a duplicate set of coolant passage holes 66 and radial coolant passages 64 such that the coolant may traverse, flow, or be forcibly pumped axially along the central coolant passage 28 and internal coolant passages 62 to form a coolant loop. In this example, the entire coolant loop may be internal to the core 42. Alternative flows, paths, and loops of the coolant through the coolant passage holes 66, radial coolant passages 64, and internal coolant passages 62, and central coolant passage 28 are envisioned.

Figure 3:
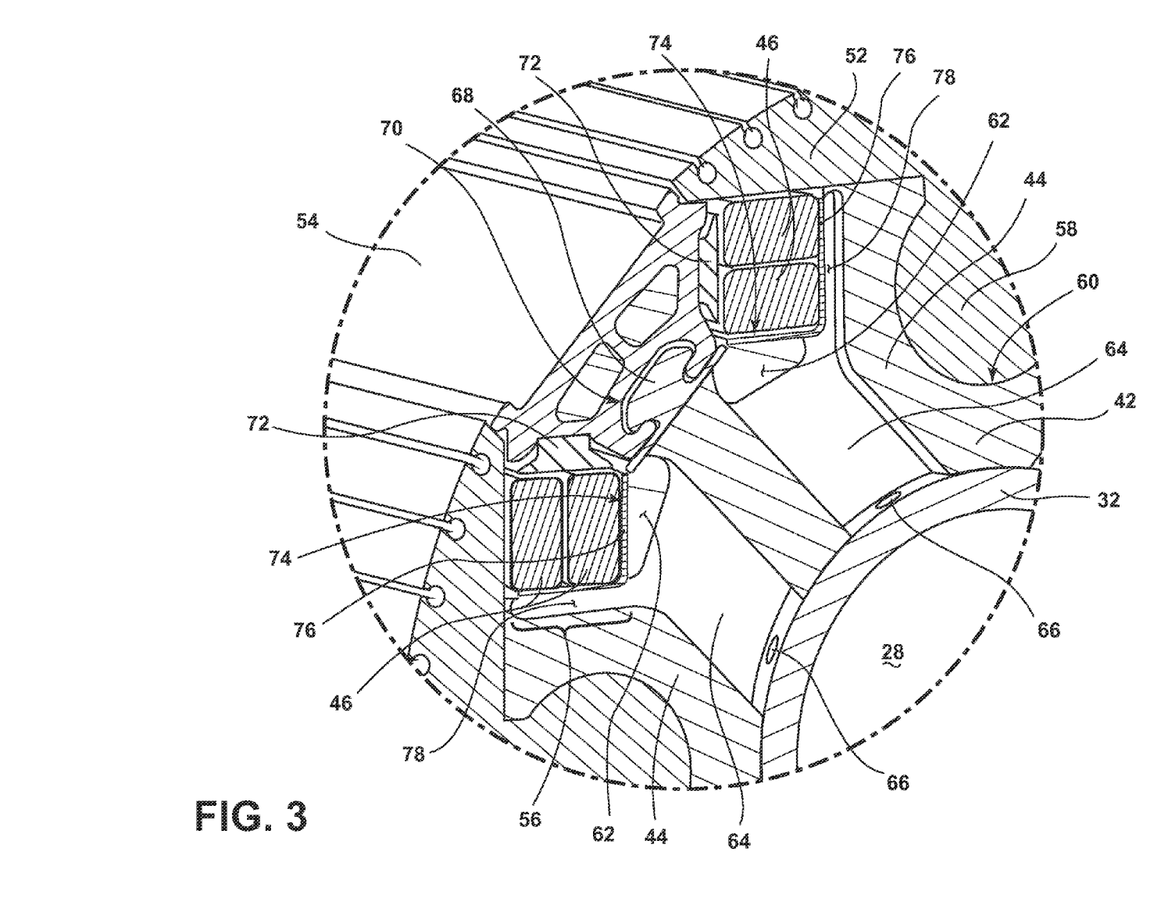
FIG. 3 is a partial sectional view illustrating a portion of the rotor assembly, taken along line 3-3 of FIG. 2.

Turning now to FIG. 3, the rotor assembly 40 is shown further comprising a second projection 68 on at least a portion of the post 44 that is keyed to be received in a second recess 70 of the radial element 54. The second projection 68 and second recess 70 have similar cross sections such that the projection 68 received within the recess 70 to removably couple the radial element 54 to the core 42. Additionally, the radial element 54 is shown further abutting a biasing element, such as a wedge 72, configured such that the coupling of the radial element 54 to the core 42 biases or secures the rotor windings 46 into the winding slot 56. The biasing of the rotor windings 46 into the winding slot 56 ensures a physical contact between the windings 46 and slot 56, which serves to enhance the thermal transfer via conduction. Alternative couplings are envisioned wherein removably coupling the compressive radial 54 to the core 42 biases the rotor windings 46 into the winding slot 56.

The core 42 further comprises a winding seat 74 at the interface of the rotor windings 46 and the posts 44, for receiving the rotor windings 46. The winding seat 74 may further comprise a thermally conductive, electrically isolating layer 76 separating the rotor windings 46 from the posts 44. This thermally conductive layer 76 may be, for example, formed by a coating applied to the winding seat 74. Alternative thermally conductive layer 76 formations and assemblies are envisioned, such as adhesion by glue, mechanical fastening, etc. Also as shown, the radial coolant passage 64 may further extend along a channel 78 of the winding seat 74, wherein the channel 78 is not adjacent to the internal coolant passage 62. Alternatively, the channel 78 may further comprise additional internal coolant passages 62 that run axially along the axis of rotation 34, parallel to, or intersecting with the existing passages 62.

Figure 4:
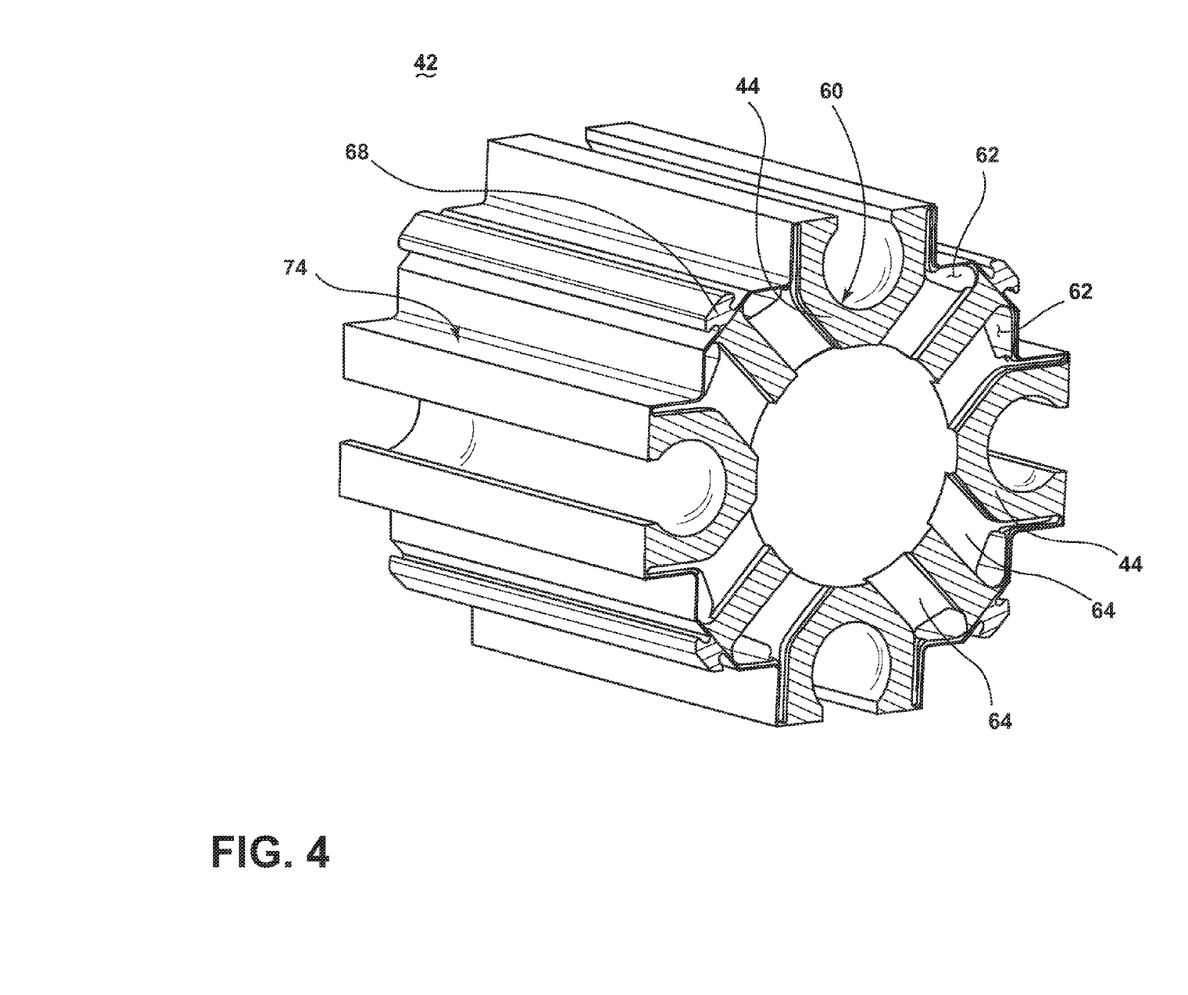
FIG. 4 is a partial sectional view of the core of the rotor assembly.

FIG. 4 illustrates one embodiment of the core 42 of the rotor assembly 40 with the cap 52, radial elements 54, rotor windings 46, and other removable components detached.

During generating operation, the rotor assembly 40 is rotated about the axis of rotation 34 by a mechanical force, such as a turbine engine, coupled with the rotatable shaft 32. During rotation, the rotor windings 46 are energized to create a pole 48, for example, DC power from a rectified AC power output of the exciter rotor 14. The rotation of the pole 48 relative to the main machine stator 22 generates a power output, such as an AC power output, which is then transmitted by the electrical power cable 30 to an electrical system, for instance, a power distribution node.

The DC current transmitted through the energized rotor windings 46 generates heat in the windings 46. Since the core 42 is more thermally conductive than the cap 52, a portion of the generated heat is transferred away from the rotor winding 46 via the thermally conductive layer 76 of the winding seat 74, to the core 42. Additionally, the wedges 72 bias the rotor windings 46 toward the winding seat 74 to ensure a firm thermal conduction interface between the windings 46 and the seat 74.

The rotor assembly 40 is also configured to remove heat generated in the rotor windings 46, as well as heat transferred to the core 42, via the above described coolant paths and loops 28, 62, 64, 66, 78. For instance, the coolant traversing through the rotor assembly 40 may directly remove the heat generated by the rotor windings 46 via the thermally conductive layer 76 directly adjacent to the internal coolant passages 62. In another instance, the heat generated may be first transferred to the core 42 as described above, and then transferred to the coolant via the coolant paths and loops 28, 62, 64, 66, 78.

As the rotor assembly 40 rotates at the anticipated high rotations per minute (RPMs), the centrifugal forces tend to push the rotor windings 46 radially outward, which may create a gap between the thermally conductive layer 76 and the windings 46. This thermal transfer by convection across the gap between the rotor windings 46 and the thermally conductive layer 76 is less effective, and thus, undesirable. The collective coupling of the cap 52, the radial element 54, and the wedges 74 to the rotor assembly 40 tend to oppose the centrifugal forces on the rotor windings 46, and help improve the thermal transfer from the windings 46 to the coolant via conduction, by ensuring the winding 46 stays in place and in contact with the thermally conductive layer 76 of the winding seat 74.

Additionally, during generating operation, the rotation of the rotor assembly 40 relative to the main machine stator 22 typically causes eddy current losses due to the changing magnetic field and/or magnetic flux harmonics in the air gap between the energized poles 48 and stator 22. Since these eddy current losses occur mainly at or near the pole 48 surface, the losses may be minimized due to the lamination structure of the cap 52, which is less electrically conductive, and thus less magnetically affected, by the losses. Fewer eddy current losses also results in less heat generated by the losses at or near the pole 48 surface.

During generating operation, the projection 58 and recess 60 also provides a secured interlocking of the cap 52 to the posts 44 and the core 42. For instance, during rotation, centrifugal forces may attempt to separate the cap 52 from the posts 44 and core 42. The interlocking of the cap 52 to the posts 44 and the core 42 by the interlocked projection 58 and the recess 60 prevents or retards this separation. Also, the interlocking of the cap 52 to the posts 44 and the core 42 provides an anti-rotation lock configured to retard the relative rotation of the cap 52 and the post 44. The assembly of the radial elements 54 further support the anti-rotation lock configuration.

Figure 5:
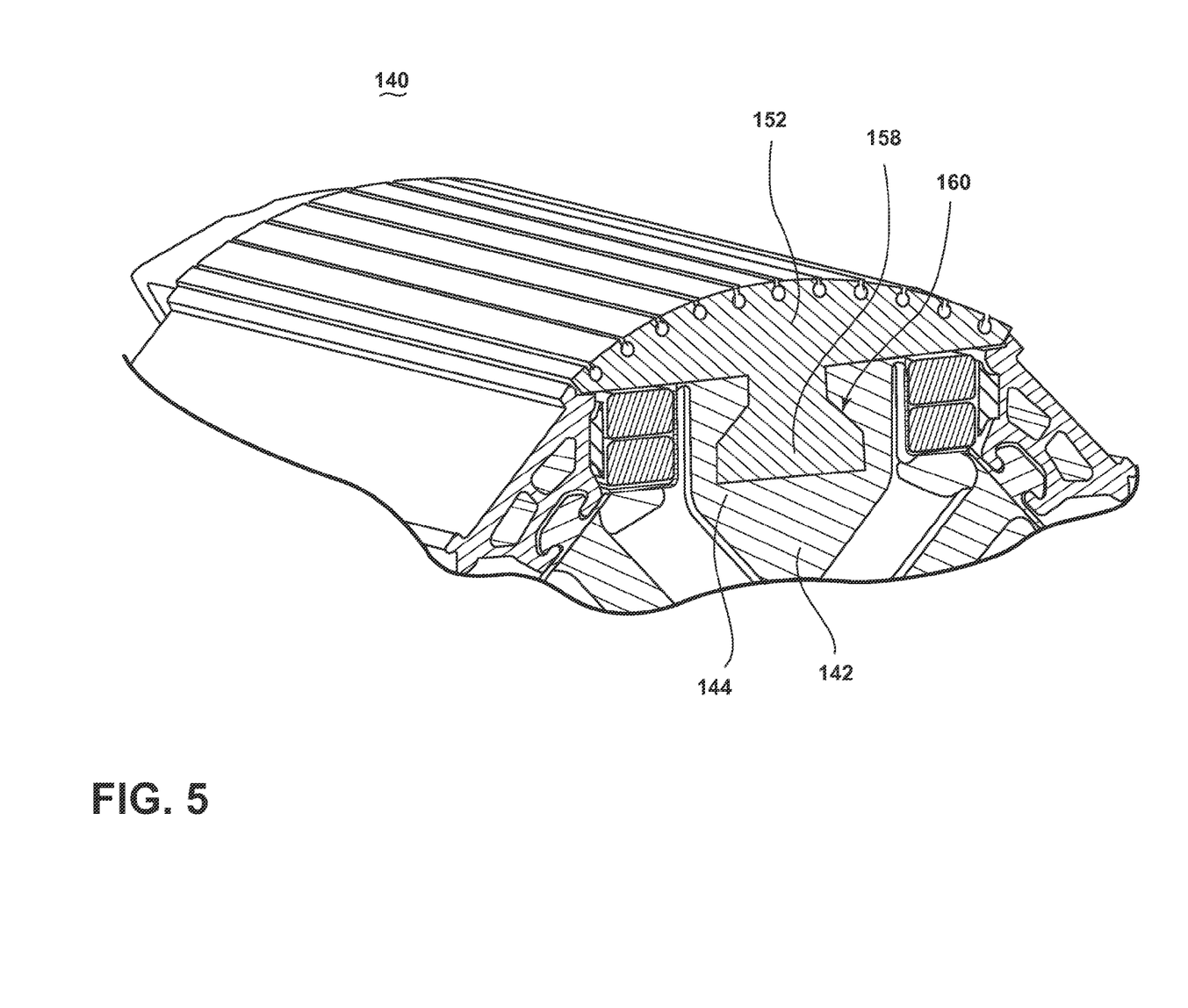
FIG. 5 is a partial sectional view of the rotor assembly according to various aspects described herein.
Figure 6:
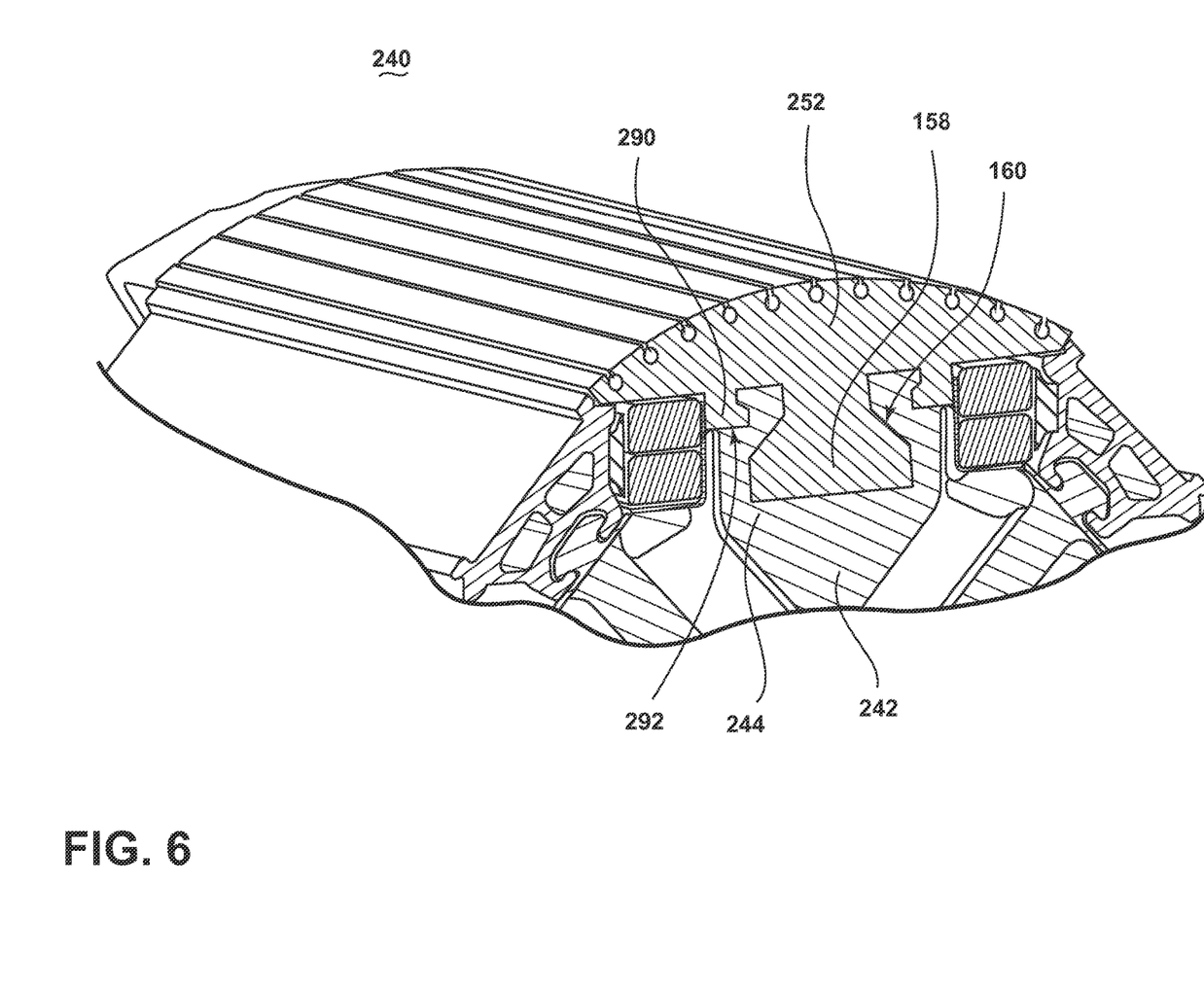
FIG. 6 is a partial sectional view of the rotor assembly according to various aspects described herein.

FIG. 5 illustrates an alternative rotor assembly 140 according to a second embodiment of the innovation. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the cap 152 alternatively comprises at least a partial trapezoidal projection 158 cross section. Correspondingly, the core 142 will have a complementary trapezoidal cross section in the recess 160 of the post 144 for removably coupling the cap 152 to the core 142. Alternate trapezoidal, or otherwise interlocking cross sections, are envisioned FIG. 6 illustrates an alternative rotor assembly 240 according to a third embodiment of the innovation. The third embodiment is similar to the first and second embodiments; therefore, like parts will be identified with like numerals increased by 200, with it being understood that the descriptions of the like parts of the first and second embodiments apply to the third embodiment, unless otherwise noted. A difference between the third embodiment and the first and second embodiments is that the cap 252 further comprises at least a second projection, shown as a corner finger 290 spaced from and on each side of the projection 158, extending from the cap 252, and abutting the opposing corners of the post 244 of the core 242. As illustrated, the corner fingers 290 have at least a partial trapezoidal cross section, but may have alternative cross sections for removably coupling to and/or interlocking with the core 242. Correspondingly, the core 242 will have a complementary cross section in at least a second recess, such as a corner finger channel 292 of the post 244.

Alternatively, embodiments are envisioned wherein the interlocking elements are reversed, for example, corner fingers 290 on the post 244, and a corner finger channels 292 on the cap 252. Additionally, while two corner fingers 290 and corresponding corner finger channels 292 are shown, alternative numbers of corner fingers 290 and corresponding corner finger channels 292 are envisioned.

The corner fingers 290 may further provide secured interlocking of the cap 252 to the core 242 during generating operation. During rotation, centrifugal forces may attempt to separate the cap 252 ends, farthest from the pole 48, from the posts 244 and core 242. The additional interlocking of the cap 252 to the core 242 by the corner fingers 290 and corresponding corner finger channels 292 further secures the cap 252 ends, preventing separation. Also, the additional interlocking of the cap 252 to the core 242 by the corner fingers 290 and corresponding corner finger channels 292 provides an additional anti-rotation lock configured to retard the relative rotation of the cap 252 and post 244.

Figure 7:
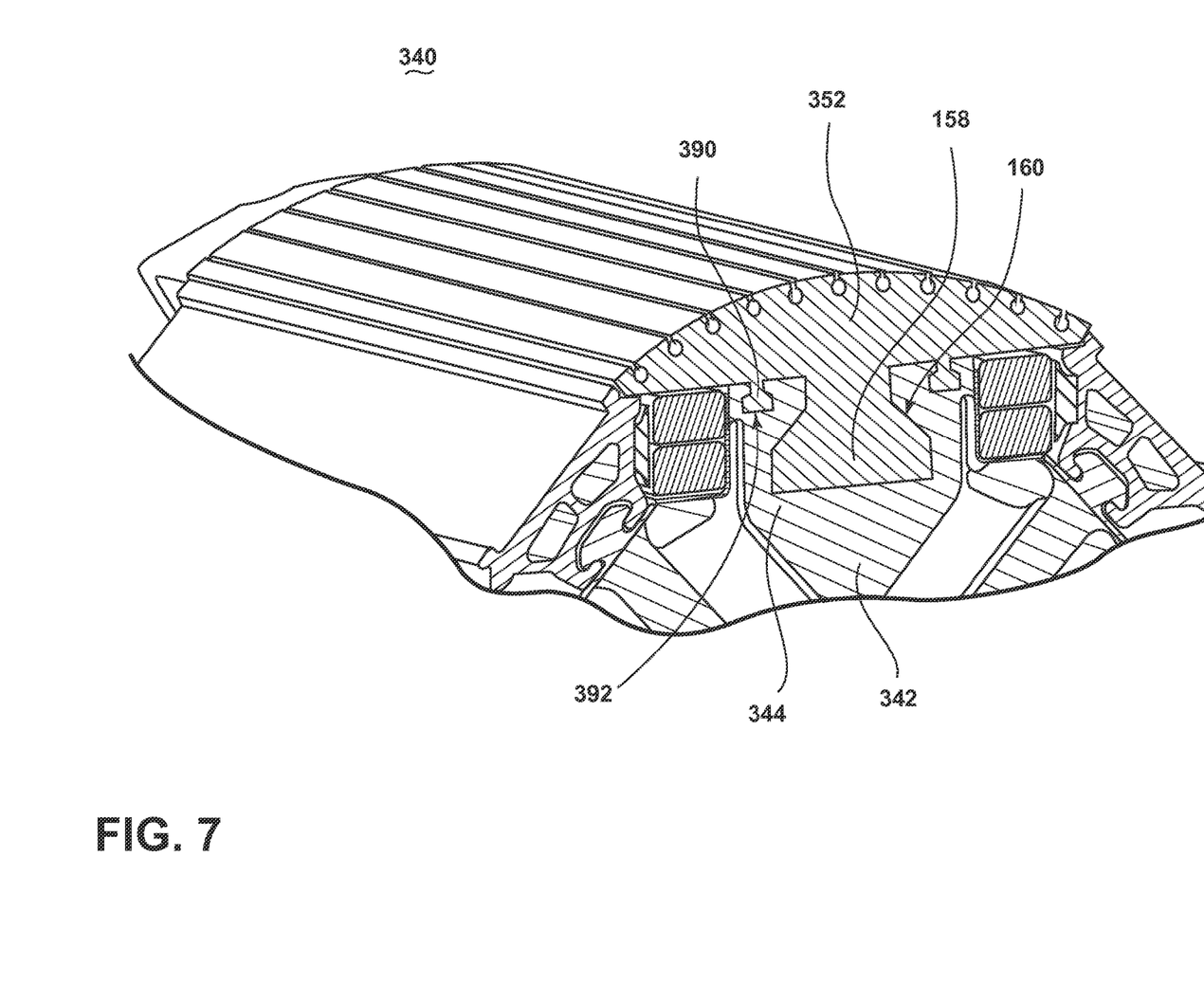
FIG. 7 is a partial sectional view of the rotor assembly according to various aspects described herein.

FIG. 7 illustrates an alternative rotor assembly 340 according to a fourth embodiment of the innovation. The fourth embodiment is similar to the first, second, and third embodiments; therefore, like parts will be identified with like numerals increased by 300, with it being understood that the descriptions of the like parts of the first, second, and third embodiments apply to the fourth embodiment, unless otherwise noted. A difference between the fourth embodiment and the first, second, and third embodiments is that the corner fingers 390 of the cap 352 are spaced from and on each side of the projection 158, extending from cap 352, but not abutting the opposing corners of the post 344 of the core 342. As illustrated, the corner fingers 390 have at least a partial trapezoidal cross section, but may have alternative cross sections for removably coupling to and/or interlocking with the core 342. Correspondingly, the corner finger channel 392 of the post 344 will have a complementary cross section. Alternatively, embodiments are envisioned wherein the interlocking elements are reversed, for example, corner fingers 390 on the post 344, and a corner finger channels 392 on the cap 352. Additionally, while two corner fingers 390 and corresponding corner finger channels 392 are shown, alternative numbers of corner fingers 390 and corresponding corner finger channels 392 are envisioned.

Many other possible embodiments and configurations in addition to that shown in the above figures are contemplated by the present disclosure. For example, one embodiment of the innovation contemplates more or fewer of the electrical machine assembly 10 components mentioned, such as poles 48, caps 52, rotor windings 46, etc. Another embodiment of the innovation contemplates using wedges 72 configured on different sides of the rotor windings 46 to bias the windings 46 into the winding seats 74. Alternatively, additional wedges 72 may be included to bias more than one side of the rotor windings 46 into the winding seats 74. Another embodiment of the innovation contemplates additional coolant passage holes 66 and radial coolant passages 64 spaced axially along the rotatable shaft 32, such that additional coolant paths and/or loops may be utilized to improve cooling. Additionally, the design and placement of the various components may be rearranged such that a number of different in-line configurations could be realized.

In yet another embodiment of the innovation, the rotor windings set 50 and winding seats 74 may be configured with, for instance a 10° clockwise and counter-clockwise rotation, compared to the illustrated example. It is envisioned that, for instance, the rotor windings 46 on one side of the pole 44 may be configured in a counter-clockwise orientation, while the corresponding windings 46 on the opposing side of the pole may be configured in a clockwise orientation. In this example, each rotated rotor windings 46 may be held in place by one or more wedges 72, to ensure thermal contact between the windings 46 and the winding seat 74. Also, additional components such as the cap 52 and thermally conductive layer 76 may also include slightly angled surfaces to match the rotated rotor windings 46. A 10° counter-clockwise rotation is one example of a configuration, and other angles are envisioned in both a clockwise and counter-clockwise direction.

The embodiments disclosed herein provide a generator rotor with a cap and core assembly. One advantage that may be realized in the above embodiments is that the above described embodiments have significantly improved thermal conduction to remove heat from the assembly. The improved thermal conductivity of the core, compared to a core comprising laminated materials, coupled with the coolant paths and/or loops provide for heat removal in a much more effective fashion from the windings to the coolant. Another advantage of the above embodiments is that the thermally conductive layer replaces the typical slot liner in the rotor in a way to provide improved mechanical integrity, along with improved thermal conductivity. The thermally conductive layer also replaces thermal conduction or cooling tubes and/or fins, reducing the number of parts, and thus increasing the reliability of the rotor assembly. The increased thermal dissipation of the rotor assembly allows for a higher speed rotation, which may otherwise generate too much heat. A higher speed rotation may result in improved power generation or improved generator efficiency without increasing generator size.

Yet another advantage of the above embodiments is that the embodiments have significantly reduced manufacturing costs due to reduction in the amount of laminated materials, which are typically costly to produce, by replacing the core with a non-laminated material, which is typically less costly to produce. Additionally, by using a solid body core, costs can further be reduced by manufacturing processes such as boring, and auto-winding of the rotor windings. Furthermore, additional cooling tubes and fins may be eliminated from construction and assembly, wherein the prior process of welding the tubes to the assembly provided increases costs.

When designing aircraft components, important factors to address are size, weight, and reliability. The above described rotor assemblies have a decreased number of parts, making the complete system inherently more reliable. This results in possibly a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine comprising:
    a non-lamination structure defining a core comprising a unitary body with a hollow center and having at least one post comprising:
        a base portion formed at the core proximate the hollow center, and
        a branched portion having at least two branches extending radially from the base portion toward an outer surface, defining a recess extending radially inward from the outer surface, and at least partially defining a winding seat;
    a cap comprising a plurality of laminations, at least one projection received within the at least one recess, and having a portion overlying the winding to collectively define an axially extending winding slot with the core;
    a winding wound about the branched portion of the post, overlying the projection, and received by the winding seat to define a pole for the electric machine; and
    a coolant path defined at least in part by the base portion of the post;
    wherein the cap is made of material that is less electrically conductive than the core.

2. The rotor assembly of claim 1 wherein the core comprises a body formed from additive manufacturing.

3. The rotor assembly of claim 1 wherein the core further comprises:
    at least one radial coolant passage, the at least one radial coolant passage extending radially outward from a center of the core;
    at least one cooling channel adjacent at least a portion of the winding slot, the at least one cooling channel extending radially outward from the radial coolant passage; and
    a layer between the at least one cooling channel and the at least a portion of the winding slot,
    wherein the layer is electrically isolating, and
    wherein the layer is thermally conductive.

4. The rotor assembly of claim 1 wherein the winding seat is rotationally offset relative to the at least one post.

5. The rotor assembly of claim 1 wherein the core is made from material that is thermally more conductive than the cap.

6. The rotor assembly of claim 5 wherein in the cap is made from cobalt and the core is made from steel.

7. The rotor assembly of claim 1 wherein the core further comprises a thermal conductor provided on the winding seat.

8. The rotor assembly of claim 7 wherein the thermal conductor is a coating applied to the winding seat.

9. The rotor assembly of claim 1 further comprising:
at least one wedge biasing the winding into the winding seat; and
    at least one radial element comprising a recess, the at least one radial element mechanically coupled to the core, the recess receiving a projection radially extending from the core and mechanically coupling the at least one radial element to the core,
    wherein the at least one wedge is disposed between the at least one radial element and the core.

10. The rotor assembly of claim 9 wherein the at least one wedge comprises a biasing element.

11. The rotor assembly of claim 1 wherein the cap is removably coupled to the core.

12. The rotor assembly of claim 11 wherein one of the cap and the core comprises a projection, the other of the cap and the core comprises a recess, and the projection is received within the recess to removably couple the cap to the core.

13. The rotor assembly of claim 12 wherein the projection and recess have complementary cross sections.

14. The rotor assembly of claim 13 wherein the complementary cross sections are at least one of: at least partially circular or at least partially trapezoidal.

15. A rotor assembly for an electric machine comprising:
a core having a plurality of poles, the plurality of poles spaced about the assembly, each pole of the plurality of poles comprising:
at least one post having a base portion formed at the core and a branched portion having at least two branches extending radially from the base portion toward an outer surface, defining a recess extending radially inward from the outer surface, and at least partially defining a winding seat;
at least one cap comprising a plurality of laminations, at least one projection received within the at least one recess and having a portion overlying the at least one winding to collectively define an axially extending winding slot with the core;
a plurality of radial elements spaced about the assembly such that each radial element of the plurality of radial elements alternates about the assembly with poles of the plurality of poles;
a winding wound about the branched portion of the post, overlying the projection, and received by the winding seat to define a pole for the electric machine; and
a coolant path defined at least in part by the base portion of the post,
wherein the at least one cap is less electrically conductive than the core-and the core does not comprise a plurality of laminations.

16. The rotor assembly of claim 15, wherein a plurality of second projections extends radially outward from the core and a plurality of second recesses are disposed within the plurality of radial elements receive the plurality of second projections, and
wherein the plurality of second projections and the plurality of second recesses mechanically couple the plurality of radial elements to the core.

17. The rotor assembly of claim 16 further comprising:
a central coolant passage extending axially along an interior of the core;
at least one radial coolant passage fluidly coupling the central coolant passage to the at least one radial coolant passage; and
a plurality of coolant passage holes spaced around the interior of the core;
wherein each coolant passage hole of the plurality of coolant passage holes aligns with one of the at least one radial coolant passage.

18. A rotor assembly for an electric machine comprising:
a non-lamination structure defining a core having at least one post about which a winding is wound to define a pole for the electric machine, with the at least one post comprising a base portion formed at the core, and a branched portion having at least two branches extending radially from the base portion toward an outer surface, defining a recess extending radially inward from the outer surface, and at least partially defining a winding seat in which the winding is received; and
a lamination structure defining a cap having at least one projection coupled to the post when the at least one projection is received within the recess and having a portion overlying the winding to collectively define an axial extending winding slot with the core, the cap comprising at least one corner finger engaged to a complementary portion of the core and spaced from the winding, the at least one corner finger comprising a trapezoidal cross section; and
a coolant path defined at least in part by the base portion of the post,
wherein the winding is wound about the branched portion of the post and overlies the projection, and
wherein the lamination structure defining a cap is less electrically conductive than the non-lamination structure defining the core.

19. The rotor assembly of claim 18, wherein a cross-section of the winding comprises a rectangular shape, the rotor assembly further comprising:
an axially extending wedge abutting the winding on a first side of the winding;
an axially extending internal coolant passage abutting the winding on a radially inward second side of the winding; and
a radially extending coolant passage abutting the winding on a third side of the winding;
wherein the cap abuts the winding on a radially outward fourth side of the winding.

20. The rotor assembly of claim 18 further comprising at least one internal coolant passage, the at least one internal coolant passage extending axially, the at least one internal coolant passage adjacent to the at least one post; and
at least one radial coolant passage fluidly coupled to the at least one internal coolant passage at a radially outward end of the at least one radial coolant passage;
wherein the at least one internal coolant passage comprises coolant.

* * * * *